Aug. 18, 1953 W. D. LEWIS 2,649,576
PSEUDOHYBRID MICROWAVE DEVICE
Filed Oct. 7, 1949 5 Sheets-Sheet 1

INVENTOR
W. D. LEWIS
BY
H. O. Wright
ATTORNEY

PSEUDOHYBRID MICROWAVE DEVICE

Filed Oct. 7, 1949 5 Sheets-Sheet 2

INVENTOR
W. D. LEWIS
BY
H. O. Wright
ATTORNEY

Aug. 18, 1953 W. D. LEWIS 2,649,576

PSEUDOHYBRID MICROWAVE DEVICE

Filed Oct. 7, 1949 5 Sheets-Sheet 3

INVENTOR
W. D. LEWIS
BY H. O. Wright
ATTORNEY

Aug. 18, 1953 W. D. LEWIS 2,649,576

PSEUDOHYBRID MICROWAVE DEVICE

Filed Oct. 7, 1949 5 Sheets-Sheet 4

INVENTOR
W. D. LEWIS
BY
H. O. Wright
ATTORNEY

Aug. 18, 1953 W. D. LEWIS 2,649,576

PSEUDOHYBRID MICROWAVE DEVICE

Filed Oct. 7, 1949 5 Sheets-Sheet 5

INVENTOR
W. D. LEWIS
BY
H. O. Wright
ATTORNEY

Patented Aug. 18, 1953 2,649,576

UNITED STATES PATENT OFFICE

2,649,576

PSEUDOHYBRID MICROWAVE DEVICE

Willard D. Lewis, Little Silver, N. J., assignor to Bell Telephone Laboratories, Incorporated, New York, N. Y., a corporation of New York

Application October 7, 1949, Serial No. 120,142

21 Claims. (Cl. 333—11)

1

This invention relates to electromagnetic wave transducers adapted for use at very high frequencies. More particularly it relates to electromagnetic wave wave-guide structures which are per se, or which embody, "pseudohybrid" arrangements, the latter structures providing predetermined wave filtering or equalizing (attenuation or phase) characteristics suitable for use in very high frequency transmission systems. The structures and systems described or mentioned in this application will be called "microwave" structures and systems.

It is to be understood that for the purposes of this application the term "microwave" includes all frequencies from approximately 100 megacycles up to and including "millimeter" waves.

The term "pseudohybrid" has been coined for the purpose of designating throughout this application a four-branched electromagnetic wave electrical junction, or modified forms thereof which may have five or more branches, the junction having, over predetermined frequency regions, the basic property of balance, substantially as do numerous well-known electromagnetic wave hydrid wave-guide or coaxial junctions of the prior microwave art (see for example United States Patent 2,445,895, granted July 27, 1948, to W. A. Tyrrell). The "pseudohybrid" junction of this application, however, does not necessarily have, inherently, the other characteristic property of prior art microwave hybrid junctions which may be designated generally as "impedance match" at each and all branches, or arms, of the junction. It should, of course, be borne in mind that the usual divergence between the ideal characteristics and those of the actual practicable structures exists with respect to prior art microwave hybrid junctions. Some aspects of this matter will be mentioned and discussed hereinafter.

As will become apparent during the course of the following detailed description of a number of illustrative structures embodying the pseudohybrid junction of this invention, virtually all of the useful functions of the conventional forms of wave guide, or coaxial, four-branched hybrid junctions of the prior art, as well as additional functions, are, however, provided through the use of structures embodying pseudohybrid junctions of the invention. Physically the structures of the invention are more simple, as well as easier to design and to construct than equivalent prior art structures employing the prior art four-branched types of hybrid junction. Pseudohybrid structures of the invention also provide,

2 in some instances as will become apparent hereinunder, a closer approximation to ideal microwave hybrid structures than do prior art structures.

Many of the structures employed to illustrate the principles of the present invention will be more readily comprehended if the following analytical segmentation of a conventional "magic T" type of electromagnetic wave waveguide hybrid junction is borne in mind.

As is explained in the above-mentioned patent to W. A. Tyrrell the "magic T" type of structure (see Tyrrell's Fig. 7) may be considered as having resulted from the "superposition" of a series wave-guide T junction (sometimes called an E-plane wave-guide T junction) and a shunt or parallel wave-guide T junction (sometimes called an H-plane wave-guide T junction). (See Tyrrell's Figs. 2 and 4, respectively.)

Very clearly the "stems" of the two T junctions thus superimposed, form two conjugately related arms of the four-arm "magic T" type of hybrid junction and terminate at the boundaries or internal surfaces of the third section of wave guide forming the common top or "cross bar" of both T's. Very clearly also the ends of this third section of wave guide are the third and fourth arms of the "magic T" type of hybrid junction, or, stated in other words, the two arms constituting the second pair of conjugately related terminals, respectively. The only dfficulty then lies in deciding where these latter two arms should be considered as terminating in the central portion of the structure. This difficulty can be resolved aptly, as will become apparent herinunder, by considering that the portion of the above-described third section of wave guide located between the planes which include the two sides of the stem of the "shunt" or "parallel" T junction (reference planes 1 and 2 of Fig. 4 of the accompanying drawings) is the throat section or junction section of the over-all "magic T" type structure and that the inner ends of the third and fourth arms mentioned above are at these planes, respectively. The aptness of this concept will perhaps be more apparent in the somewhat more clearly segmented structure of Fig. 8 described in detail hereinbelow.

As understood by those skilled in the art, one arm of a microwave electromagnetic wave hybrid junction is conjugately related to another when, with the structure in a balanced condition, energy introduced into either of the arms will not pass to the other arm.

It has been discovered, and is demonstrated mathematically below, that if both arms of one of the conjugately related pairs of terminals, above described, are loosely coupled to the throat section of the hybrid structure in the planes of their respective junctures with said throat section, as defined above, that definite new results are obtained which make possible the construction of over-all structures having properties equivalent or superior to those of more complicated structures of the prior art.

Briefly stated, if the first pair of conjugately related arms (the "stems" of the two "superimposed" simple T sections) are loosely coupled to the throat section of the "magic T"-type structure, at frequencies remote from resonant conditions in these loosely coupled arms, they will be in effect isolated from the other pair of conjugately related arms and the latter, together with the throat section joining them, will be in essence simply a smooth section of wave guide freely passing all said remote frequencies. (Assuming, of course, that all of the said remote frequencies are higher than the cut-off frequency of the guide since a wave guide is, per se, a high-pass filter cutting off all frequencies below a cut-off frequency which depends, as is well known to those skilled in the art, on the cross-sectional dimensions of the wave guide.)

The structure just described (i. e., a "magic T" type of structure with the conjugately related pair of "stem" arms loosely coupled to the throat section of the junction) is, then, naturally adapted for use in that type of wave-filtering structure which suppresses a particular limited band of frequencies but passes all frequencies above or below the particular band. (Variously called a "band-rejection," "band-suppression" or "band-reflecting" filter.) (As will be explained below this type of structure is also readily adaptable for use in equalizing structures.)

On the other hand, when the second pair of conjugately related arms (i. e., the two ends of the third section of wave guide which becomes in the hybrid T the common cross bar of the superimposed T's and includes the above-defined throat section centrally placed between the arms) are loosely coupled to the throat section, no transmission will take place between the arms of the first conjugately related pair unless the frequency approaches a resonance in one or both of the loosely coupled second conjugately related pair of arms. This structure is therefore obviously naturally adapted for use in wave-filtering structures which pass only a predetermined band of frequencies and suppress (or reflect) all other frequencies above or below the predetermined band. (Commonly referred to as a "band-pass" wave filter.)

Generically defined, a microwave "pseudohybrid" junction of the invention is, therefore, a microwave junction of at least two pairs of arms to a common microwave throat section, the individual arms of each pair being conjugately related to each other over a portion at least of the range of microwave frequencies with which the structure is to operate, one of said pairs of arms being loosely coupled to the common microwave throat section.

It should be noted that the loosely coupled arms can then be given any length suitable to form a cavity resonant at any predetermined frequency of resonance or suitable for joining more complex resonant structures thereto without introducing disturbing impedance irregularities.

The four-branched hybrid junctions of the prior art, such as the so-called "magic T" wave-guide junction, the four-branched wave-guide ring junction and the four-branched coaxial ring junction, require, as is well understood by those skilled in the art, that for even reasonably good balance the respective lengths of the four arms leading to the actual junction be precisely proportioned with respect to the wavelength or frequency of the energy to be used. Since in the majority of cases for electrical transmission in communication systems it is desired to transmit a relatively broad band of frequencies, prior art four-branch wave-guide or coaxial hybrid junctions leave much to be desired in that they are precisely balanced only over a relatively narrow frequency band.

Somewhat broader band operation (i. e., operation over a wider range of frequencies) without a serious deterioration of the impedance match at any termination or terminal of the junction or of the balance of the junction, can be effected by such compensating contrivances as are disclosed, for example, in the copending application of C. F. Edwards, Serial No. 637,124, filed December 24, 1945, and assigned to applicant's assignee.

The necessity for inserting compensating members can be eliminated, in a number of important instances, by the use of the "pseudohybrid" junction arrangements of the present invention, as will become apparent hereinunder. Also satisfactory operation over a much broader band of frequencies can frequently be attained by use of pseudohybrid structures than by use of compensated conventional hybrid structures.

A principal object of the present invention is to provide improved wave-guide structures suitable for use as electrical wave filters, or as delay (phase) or attenuation equalizers in very high frequency or "microwave" transmission systems.

A further object is to provide simpler and cheaper wave-guide structures which will embody the useful characteristics of prior art "magic T" and related hybrid junctions.

Another object is to provide improved wave-guide filters and equalizers adapted for use in broad band microwave energy transmission systems.

A still further object of the invention is to provide wave-guide hybrid junctions which operate satisfactorily over very wide frequency ranges.

Other and further objects will become apparent during the course of the following description and from the appended claims.

The principles of the invention will be more readily understood from the following detailed description of illustrative structures and from the figures of the accompanying drawings in which.

A. *The hybrid junction*

The transmission properties of a perfect, or ideal, hybrid junction will now be determined from the basic ideal hybrid characteristics in a form convenient for wave filter and equalizer design.

The essential hybrid characteristic desired can be stated as follows: A voltage wave incident upon the junction from any arm divides equally between the two adjacent arms, nothing enters the opposite or conjugate arm, and no reflection of energy occurs. It is also assumed that there is substantially negligible energy loss within the junction, as will be true for all junctions suitable for use in hybrid and pseudohybrid filters and equalizers.

Figure 1:
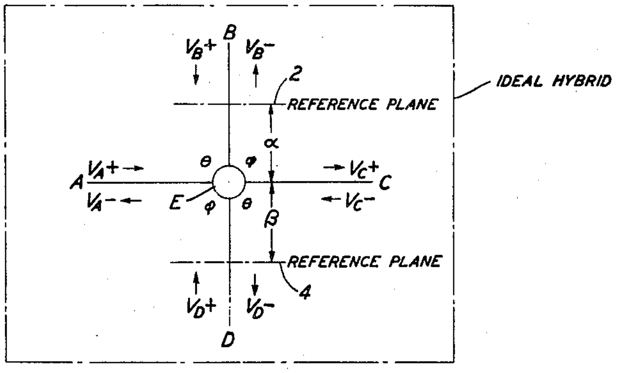
Fig. 1 is a diagrammatic representation of a perfect or ideal four-branch hybrid junction with impedances inserted in two of its arms and is employed to explain the relation between a perfect, or ideal, four-branch hybrid junction and structures of the present invention.

Fig. 1 represents diagrammatically a perfect or ideal hybrid four-branch or four-arm junction. Dash lines 2 and 4 represent reference planes at which impedances will be assumed to be positioned in explaining the "pseudohybrid" junctions of the present invention. The four branches or arms of the junction are designated by the letters A, B, C and D, respectively. The circle E represents a throat or junction portion of the device by which the innermost ends of the four arms are joined together.

Let us arbitrarily designate the voltage of waves flowing towards the junction as $$V_A^+,\ V_B^+,\ V_C^- \text{ and } V_D^+$$

in arms A, B, C and D, respectively, also the waves flowing away from the junction as $$V_A^-.\ V_B^-,\ V_C^+,\ V_D^-$$

in arms A, B, C, D. We will now examine relations between these voltages where the structure represented by Fig. 1 is assumed to be a perfect or ideal hybrid.

Referring to Fig. 1, one can write the following four equations. (With reference to Fig. 1, it may appear that the phase shifts between two of the pairs of adjacent arms have been arbitrarily made equal. This is not so however, since there are four independent angles. The phase shifts between the adjacent arms are: (1) $\theta+\alpha$ for A—B, (2) $\alpha+\phi$ for B—C, (3) $\theta+\beta$ for C—D, and (4) $\beta+\phi$ for D—A. No two of these are equal.)

$$\sqrt{2}\ V_A^- = V_B^+ \epsilon^{-i(\alpha+\theta)} + V_D^+ \epsilon^{-i(\theta+\phi)} \qquad (1)$$

$$\sqrt{2}\ V_B^- = V_A^+ \epsilon^{-i(\theta+\alpha)} + V_C^- \epsilon^{-i(\phi+\alpha)} \qquad (2)$$

$$\sqrt{2}\ V_C^+ = V_B^+ \epsilon^{-i(\alpha+\phi)} + V_D^+ \epsilon^{-i(\beta+\theta)} \qquad (3)$$

$$\sqrt{2}\ V_D^- = V_C^- \epsilon^{-i(\theta+\beta)} + V_A^+ \epsilon^{-i(\phi+\beta)} \qquad (4)$$

Also, the principle of the conservation of energy requires that $$V_A^+\overset{*}{V_A^+} + V_C^-\overset{*}{V_C^-} = V_B^-\overset{*}{V_B^-} + V_D^-\overset{*}{V_D^-} \qquad (5)$$

If Equations 2 and 4 are multiplied by their complex conjugates (denoted by the asterisk above the term) and added one obtains $$V_B^-\overset{*}{V_B^-} + V_D^-\overset{*}{V_D^-} = V_A^+\overset{*}{V_A^+} + V_C^-\overset{*}{V_C^-} + (V_A^+\overset{*}{V_C^-} + V_A^+\overset{*}{V_C^-}) \cos(\phi-\theta) \qquad (5a)$$

The asterisks, as noted above, denote "the complex conjugate of."

From Equation 5*a* it is obvious that Equation 5 will be satisfied if $$\cos(\theta-\phi)=0, \text{ or } \theta=\phi+\frac{\pi}{2} \qquad (6)$$

In order to proceed directly toward practical structures, beyond this point we must impose further qualifications on the performance of the hybrid. Since the requirements are somewhat different for band-rejection type filters than they are for band-pass type filters it is convenient to divide the analysis into two parts, applicable directly to the two types, respectively.

B. *Band-rejection type filters*

Figure 2:
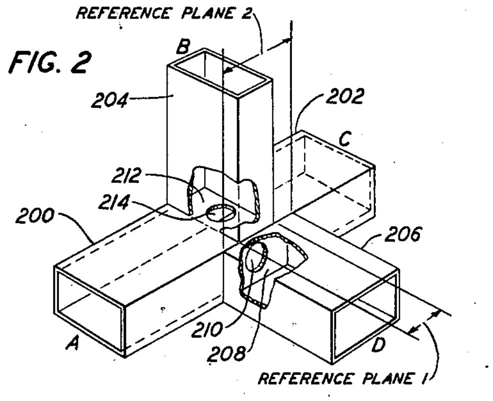
Fig. 2 is a structure of the invention embodying a "pseudohybrid" four-branch junction of the invention, the over-all structure being suitable for use in a microwave band-rejection (or band-reflecting) wave filter or alternatively in a microwave equalizer.

Fig. 2 shows a four-branch wave-guide hybrid junction, the four branches being designated A, B, C and D, respectively. In Fig. 2 all four arms 200, 202, 204 and 206 comprise sections of wave guide of like rectangular cross-sectional dimensions which, by way of example, for frequencies in the neighborhood of 4000 megacycles can be sections of wave guide having a shorter side dimension of one inch and a longer side dimension of two inches (inner dimensions of a right cross-section). The arrangement of Fig. 2 differs from the well-known prior art four-branch wave guide "magic T" in that at reference planes 1 and 2 arms 204 and 206 are partly closed by septa or partitions which can be plane conducting sheet members 212 and 208, respectively. Members 212 and 208 are provided with openings or irises 214 and 210, respectively, and are otherwise merely coplanar extensions of the top and side walls, respectively, of the straight section of wave guide comprising the throat portion of the hybrid junction and the two arms 200 and 202.

Figure 3:
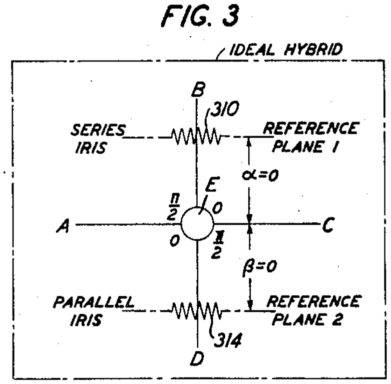
Fig. 3 is a diagrammatic representation similar to that of Fig. 1 but modified to more clearly resemble and to facilitate the explanation of the nature and functioning of the device of Fig. 2.

Fig. 3 represents diagrammatically the wave-guide structure of Fig. 2 for the frequency region over which the wave-guide structure can be said to be a reasonably accurate approximation of an ideal or perfect four-branch hybrid junction. Impedances 310 and 314 represent the impedances of the irises 210 and 214 of Fig. 2, respectively. As for Figs. 1 and 2, the four arms are designated A, B, C and D and the throat section is designated E. For the practical uses contemplated for structures of the invention of this type, the septa will be at the points of juncture between arms B and D and the throat section E, as indicated by the equating of $\alpha$ and $\beta$ to zero, respectively. For clarity and generality impedances 310 and 314 are shown at intermediate points along arms B and D, respectively.

For the type of structure shown in Fig. 2 and diagrammed in Fig. 3, it is apparent that perfect transmission from the input arm (A) to the output arm (C) would be obtained if the holes 210 and 214 were closed.

If we place this requirement on the general hybrid of Fig. 1, shorts placed at the reference planes $\alpha$ and $\beta$ (designated 1 and 2 in Figs. 2 and 3) must also produce perfect transmission. Thus voltage waves incident upon the junction from arm A, are completely reflected in arms B and D at $\alpha$ and $\beta$; and must, therefore, add in phase in arm C. This requires that $$\theta+2\alpha+\phi=\phi+2\beta+\theta, \text{ or } \alpha=\beta \qquad (7)$$

The two Equations 6 and 7, which include all of the necessary restrictions, contain four unknowns. Thus we may specify any two of them arbitrarily.

Let $$\alpha=\beta=0, \text{ and } \phi=0$$

Then we have $$\theta=\frac{\pi}{2} \qquad (8)$$

Using these values in Equations 1 through 4, inclusive, we get $$\sqrt{2}\, V_A^-=-jV_B^++V_D^+ \qquad (9)$$

$$\sqrt{2}\, V_B^-=-jV_B^++V_C^- \qquad (10)$$

$$\sqrt{2}\, V_C^+=+V_B^+-jV_D^+ \qquad (11)$$

$$\sqrt{2}\, V_D^-+-jV_C^-+V_A^+ \qquad (12)$$

When the hybrid junction is used as the equivalent of a "four-pole," (i. e., a four-terminal low frequency lumped-element electrical network such as a lattice), substantially non-dissipative equivalents of two terminal networks are connected to arms B and D. The substantial equivalence at microwave frequencies of specific waveguide structures with lower frequency "lumped-element" electrical structures is explained in detail, for example, in my copending application Serial No. 789,985, filed December 5, 1947, which matured into United States Patent 2,531,447, granted November 28, 1950, and in the copending application of D. H. Ring, Serial No. 68,361, filed December 30, 1948. As a matter of convenience, the terminology developed for use with low frequency lumped-element structures will be employed at times in referring to substantially equivalent "microwave" structures though the latter are of course wave-guide structures. These latter devices ("microwave" equivalents of two terminal networks) since they are, as mentioned above, substantially non-dissipative, produce a complete reflection of the incident waves with arbitrary phase angles Ψ1 and Ψ2, respectively, thus $$V_B^+=-V_B^-\epsilon^{-j2\Psi_1} \qquad (13)$$

and $$V_D^+=-V_D^-\epsilon^{-j2\Psi_2} \qquad (14)$$

If these relations are used in Equations 9 through 12, we can then solve for $$V_A^+ \text{ and } V_A^-$$

in terms of $$V_C^+ \text{ and } V_C^-$$

and thus relate the input waves to the output waves in the desired manner. By the usual methods we obtain $$V_A^+=-j\epsilon^{-j(\Psi_1+\Psi_2)}\sec(\Psi_1-\Psi_2)V_C^++\tan(\Psi_1-\Psi_2)V_C^- \qquad (15)$$

and $$V_A^-=\tan(\Psi_1-\Psi_2)V_C^++j\epsilon^{+j(\Psi_1+\Psi_2)}\sec(\Psi_1-\Psi_2)V_C^- \qquad (16)$$

In matrix form these become $$\begin{vmatrix} V_A^+ \\ V_A^- \end{vmatrix}=\begin{vmatrix} -j\epsilon^{-j(\Psi_1+\Psi_2)}\sec(\Psi_1-\Psi_2) & \tan(\Psi_1-\Psi_2) \\ \tan(\Psi_1-\Psi_2) & +j\epsilon^{+j(\Psi_1+\Psi_2)}\sec(\Psi_1-\Psi_2) \end{vmatrix} \begin{vmatrix} V_C^+ \\ V_C^- \end{vmatrix} \qquad (17)$$

(The matrix Equation 17 contains neither more nor less information than the two preceding Equations 15 and 16 taken together, but it is often more convenient to use. For example, when the performance of a chain of "four poles" must be determined it is necessary to manipulate only the coefficients of the various equations. The independent variables (voltages in the above case) appear only at the beginning and at the end of the process.) (See any standard treatise on matrix algebra.)

Equation 17 describes a hybrid band-reflection filter with reactances $jX_1=j\tan\Psi_1$ and $jX_2=j\tan\Psi_2$ placed at the references planes in the branch arms. As stated above, and as will presently become apparent, this form is convenient for the analysis of band-rejection type filters.

When the device of Fig. 2 is used in a filter, as will be described in detail below in connection with Fig. 7, for example, we assume a matched generator and load [i. e., it is assumed that the impedances of the generator (or source of power) and the load will substantially match the impedances of the hybrid arms to which they are to be connected, respectively]. Throughout this application the generator (or source of power) is normally connected to the arm designated "input," or simply designated by an inwardly directed arrow. Similarly the load is normally connected to the arm designated "output" or simply designated by an outwardly directed arrow. Arrows directed across the shorter cross-sectional dimension of the guide (see Fig. 8) indicate the normal direction of the electric vector of the wave to be directed through the device. (Ordinarily, whenever practicable, filters or equalizers are used in circuits where the actual input and output impedances substantially match the input and output impedances of the structure, respectively.) Thus $$V_C^- = 0$$

and it follows that the total voltage across the load, $V_C$, is equal to $$V_C^+$$

Also, since the generator is matched $$V_A^+ = \tfrac{1}{2} V \text{ gen.}$$

where V gen. is the voltage of the generator. From Equation 17 and using these equalities we have $$\frac{V_A^+}{V_C^+} = \frac{\frac{1}{2}V \text{ gen.}}{V_C} = -j\epsilon^{-j(\Psi_1+\Psi_2)} \sec (\Psi_1 \Psi_2) \qquad (18)$$

Now ½V gen. is the voltage across the load when the network is removed, assuming that the impedance of the load matches that of the generator, and $V_C$ is the load voltage with the network in place. Equation 18 is therefore the insertion voltage ratio which we shall call R. For any four-pole the $A_{11}$ (upper left-hand) term of the matrix which relates the input to the output traveling voltages waves, as in Equation 13, is the insertion voltage ratio of the network between a unit impedance generator and a unit impedance load. This is often a convenient method for mesh computing a network. In determining the insertion loss, only the absolute value of ratio R is of importance.

$$|R|^2 = \sec^2(\Psi_1 - \Psi_3) = 1 + \tan^2(\Psi_1 - \Psi_2) \qquad (19)$$

In order to obtain a maximally flat band-rejection response it is necessary for the loss expression to be of the form $$|R|^2 = 1 + \frac{1}{(AF)^{2\mu}} \qquad (20)$$

where A is a cut-off parameter, F is the frequency variable, referred to an origin at the band center, and $\mu$ is the number of resonances. Equations 19 and 20 will be of the same form when $$\tan (\Psi_2 - \Psi_1) = \frac{1}{(AF)^{\mu}} \qquad (21)$$

if $X_1$ and $X_2$ are the reactances of two terminal networks connected to the branch arms of the hybrid we have $$X_1 = \tan \Psi_1, \text{ and } X_2 = \tan \Psi_2 \qquad (22)$$

These values for $X_1$ and $X_2$ substituted in tan ($\Psi_2 - \Psi_1$) give $$\tan (\Psi_2 - \Psi_1) = \frac{\tan \Psi_2 - \tan \Psi_1}{1 + \tan \Psi_1 \tan \Psi_2} = \frac{X_2 - X_1}{1 + X_1 X_2} \qquad (23)$$

Finally from (21) and (23) we have $$\frac{1}{(AF)^{\mu}} = \frac{X_2 - X_1}{1 + X_1 X_2} \qquad (24)$$

The design of a filter now consists simply of choosing $X_1$ and $X_2$ so that Equation 24 is satisfied. This can be done for a particular value of $\mu$ by writing out the values $X_1$ and $X_2$, substituting these in (24) and equating to zero the coefficients of all powers of F except $F\mu$. This has been done, by way of example, for two, three and four resonance filters. The results are given in Table I, below.

TABLE I. MAXIMALLY FLAT HYBRID FILTERS

| Number of Resonances | Form Assumed for $X_1$ and $X_2$ | Conditions for Maximally Flat Response |
|---|---|---|
| 2 | $X_1 = \dfrac{-1}{\frac{2}{f_0}\sqrt{\frac{C}{L}}(F - F_1)}$ <br> $X_2 = \dfrac{-1}{\frac{2}{f_0}\sqrt{\frac{C}{L}}(F + F_1)}$ | $F_1 = 0.707 F_c$ <br> $\sqrt{\frac{C}{L}} = 0.707 \frac{(f_0)}{(F_c)}$ |
| 3 | $X_1 = \dfrac{-1}{\frac{2}{f_0}\sqrt{\frac{C_1}{L_1}}(F - F_1)} + \dfrac{-1}{\frac{2}{f_0}\sqrt{\frac{C_1}{L_1}}(F + F_1)}$ <br> $X_2 = \dfrac{-1}{\frac{2}{f_0}\sqrt{\frac{C_2}{L_2}}(F)}$ | $\sqrt{\frac{C_1}{L_1}} = \frac{(f_0)}{(F_c)}$ <br> $F_1 = F_c$ <br> $\sqrt{\frac{C_2}{L_2}} = \frac{1}{2}\frac{(f_0)}{(F_c)}$ |
| 4 | $X_1 = \dfrac{-1}{\frac{2}{f_0}\sqrt{\frac{C_1}{L_1}}(F + F_1)} + \dfrac{-1}{\frac{2}{f_0}\sqrt{\frac{C_2}{L_2}}(F - F_2)}$ <br> $X_2 = \dfrac{-1}{\frac{2}{f_0}\sqrt{\frac{C_2}{L_2}}(F + F_2)} + \dfrac{-1}{\frac{2}{f_0}\sqrt{\frac{C_1}{L_1}}(F - F_1)}$ | $F_1 = 0.613 F_c$; $F_2 = 1.153 F_c$ <br> $\sqrt{\frac{C_1}{L_1}} = 0.586 \frac{(f_0)}{(F_c)}$; $\sqrt{\frac{C_2}{L_2}} = 1.103 \frac{(f_0)}{(F_c)}$ |

In all the formulae of Table I:
$f_0$=mid-band frequency of filter.
$f$=any specific frequency within the region of interest.
$F = f - f_0$.
$F_c$=value of $F$ for 3 db loss=½(3 db band width).
$\sqrt{\frac{C}{L}}$=the band width factor which is inversely proportional to the band width.

If, as is the case in the embodiments illustrated in the drawings accompanying this application, each of the specific impedances is realized as a cavity coupled to a principle wave guide or a junction by an iris, the band width is made larger by increasihg the size of the iris. In practice, it is usually more convenient to start with an iris somewhat smaller than that which experience and calculation indicate will be required. The iris is then gradually enlarged until measurement of band width indicates that the desired magnitude has been achieved.

In general the resonant frequency of a particular cavity can be made to occur at a lower frequency by increasing the size of the cavity. An alternative method is to increase the penetration of a capacitative plug. The reciprocal of a given impedance is readily achieved by adding a quarter wavelength of transmission line between the iris of a cavity and iris combination (which has been adjusted to realize the impedance) and the plane at which the combination is connected to the principle wave guide or junction. Methods of combining several resonant cavity structures in series or in parallel are described in connection with Figs. 13 and 14 of my copending application Serial No. 789,985, filed December 5, 1947.

The number of resonances can, obviously, be indefinitely increased. Wave-guide structures providing any desired number of resonances are described hereinunder. (See particularly Figs. 11 and 12.) Table I is applicable to structures which, for the number of resonances employed, will provide the flattest transmission loss characteristic throughout the rejected band and assumes that all resonances will be located within the rejected band. When the phase characteristics throughout the transmitted regions are deemed important, they may be controlled by placing resonances in those regions precisely as in the design of low frequency lumped-element networks. See, for example, the "Radio Engineer's Handbook" by F. E. Terman, pages 238 to 249, published by McGraw-Hill Book Company, New York, 1943.

C. *Band-pass filters*

It is apparent that the band-pass filter design will follow closely the band-rejection case; however, there are enough points of difference to make it advisable to inquire as to the exact nature of the band-pass solution.

Figure 4:
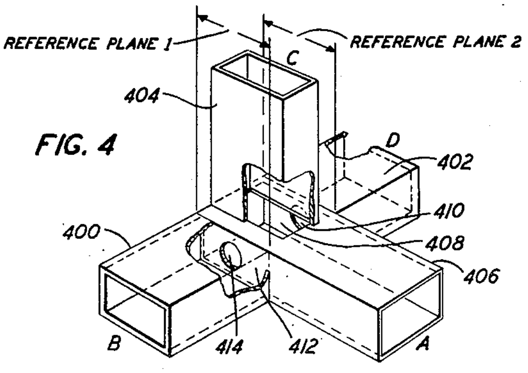
Fig. 4 is a structure of the invention embodying a "pseudohybrid" four-branch junction of the invention, the over-all structure being suitable for use in a microwave band-pass wave filter.

The basic pseudohybrid arrangement, suitable for use in constructing microwave band-pass wave filters, is indicated by Fig. 4 and an actual microwave pseudohybrid wave-guide band-pass filter will be described in detail below, for example, in connection with Fig. 6. In Fig. 4 a four-branch wave-guide hybrid junction substantially identical with that of Fig. 2, except for the location of members 412 and 408 is shown. The designation letters A, B, C and D of the four branches in Fig. 4 have been rearranged so that the A and C branches are unimpeded as was the case for Fig. 2. As for the structure of Fig. 2, in Fig. 4 all four arms 400, 402, 404 and 406 and the throat of the hybrid junction (which is the central portion bounded by the septa 408 and 412 of the section of wave guide of which arms 400 and 402 are the ends) comprise sections of wave guide substantially identical with the corresponding portions of Fig. 2. In Fig. 4, however, members 408 and 412 are septa or partitions which can be plane conducting sheet members extending across the interior of the junction as virtual continuations of the shorter sides of the arm 406. Members 408 and 412 are provided with openings, or irises, 410 and 414, respectively.

Figure 5:
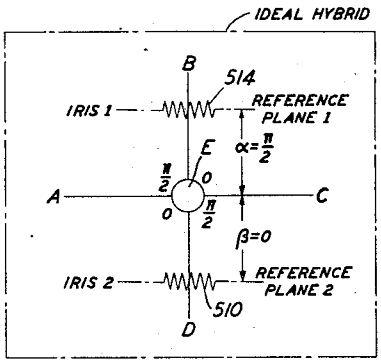
Fig. 5 is a diagrammatic representation similar to that of Fig. 1 but modified to more closely resemble and to facilitate the explanation of the nature and functioning of the device of Fig. 4.

Fig. 5 represents diagrammatically the wave-guide structure of Fig. 4 for the frequency region over which the wave-guide structure can be said to be a reasonably accurate approximation of an ideal or perfect four-branch hybrid junction. The four arms are designated by the letters A, B, C and D, respectively, and the throat portion by the letter E. A phase difference of $$\frac{\pi}{2}$$

exists between the septa 408 and 412 so that if the first is arbitrarily assumed to be $$\frac{\pi}{2}(\alpha)$$

the second will then be $0(\beta)$. Impedances 510 and 514 represent the impedances of irises 410 and 414, respectively, of Fig. 4. It follows from symmetry and because of the polarization of the guides A and C, that shorts placed at the reference planes 1 and 2 of Figs. 4 and 5 will produce zero transmission between A and C. If this requirement is placed on the general ideal hybrid of Section A, or Fig. 1, described above, and the resulting equations are solved for the input waves in terms of the output waves exactly as was done for the band-rejection filter in Section B, above, the equivalent circuit represented diagrammatically in Fig. 5 and the following relations are obtained.

$$\begin{vmatrix} V_A^+ \\ V_A^- \end{vmatrix} = \begin{vmatrix} \csc(\Psi_2-\Psi_1)\epsilon^{+j(\Psi_1+\Psi_2)} & -\cot(\Psi_2-\Psi_1) \\ -\cot(\Psi_2-\Psi_1) & \csc(\Psi_2-\Psi_1)\epsilon^{-j(\Psi_1+\Psi_2)} \end{vmatrix} \begin{vmatrix} V_C^+ \\ V_C^- \end{vmatrix} \quad (25)$$

This equation describes a hybrid filter with reactances $jX_1=j\tan\Psi_1$ and $jX_2=j\tan\Psi_2$ placed at the reference planes 1 and 2 in the branch arms.

Proceeding as in Section B, above, we see that the square of the insertion voltage ratio is $$|R|^2=\csc^2(\Psi_2-\Psi_1)=1+\cot^2(\Psi_2-\Psi_1) \quad (26)$$

In order to obtain a maximally flat band-pass response this must be of the form $$|R|^2=1+(AF)^{2\mu} \quad (27)$$

or $$(AF)^{\mu}=\cot(\Psi_2-\Psi_1) \quad (28)$$

which is the exact equivalent of Equation 21. Thus the relations given in Table I for the band-rejection filter will apply without change to the band-pass filter, provided that the reference planes are chosen as indicated in Figs. 4 and 5. Similarly as for the band-rejection filter, different spacings of the resonant frequencies with some of them located outside the pass band can be employed particularly where attenuation of unwanted frequencies or the attainment of specific phase characteristics are of paramount importance. These matters are discussed, with relation to low-frequency, lumped-element, wave filters, by Terman and the references cited by him in his above-mentioned "Radio Engineer's Handbook."

D. *Delay equalizers*

The phase response of a given hybrid network can be easily computed. From Equations 17 and 25 the insertion phase shift is $\Psi_1+\Psi_2$. Thus the delay of the network is the sum of the delays of the branch arms.

From the Equations 20 and 24 for the band-rejection filter $$|R|^2=1+\frac{(X_2-X_1)^2}{(1+X_1X_2)} \qquad (29)$$

and from this it is apparent that the device becomes an all-pass network when $X_1=X_2$. (Some may question this since the arms of a low-frequency, lumped-element, all-pass network, in lattice form, are inverse. It comes about because of the manner in which the reference planes have been chosen as will become apparent during the following detailed description.) The delay of an all-pass network is thus twice the delay of one of the branch arms.

As is well known to those skilled in the art, wave-guide structures for use at high and microwave frequencies should be constructed of highly conductive material such as copper, brass, or the like. Wave guides should be accurately made and all seams should be brazed or soldered throughout their entire length. Sheet copper or brass $\frac{1}{16}$-inch thick is suitable for most wave-guide structures though, in a few instances, specific small portions can advantageously be made of silver, or can be gold plated, to reduce losses, as will be mentioned hereinunder.

*Pseudohybrid band-pass filter*

Figure 6:
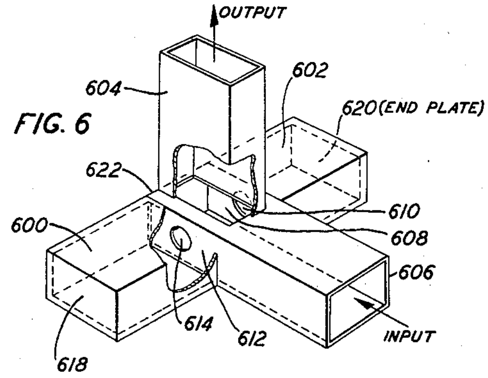
Fig. 6 is one form of a two-resonance band-pass wave filter of the invention employing the "pseudohybrid" junction of Fig. 4.

In Fig. 6 one structure embodying the pseudohybrid junction of Fig. 4 in a wave-guide band-pass filter suitable for use at very high or microwave frequencies is shown.

In this structure the lateral branch arms 600 and 602 are closed at their free ends by plane conductive sheets or plates 618 and 620, respectively, at predetermined distances from the irised partitions 612 and 608, respectively. These distances are determined in each instance by the consideration that the resulting cavity comprising the section of the arm between the irised partition and the end plate shall be resonant at a specific predetermined frequency relatively near the mid-frequency of the band of frequencies to be passed by the structure. The distances will, accordingly, be different, but both will be approximately a half wavelength (in the wave guide) of the mid-frequency of the pass band or some multiple of said half wavelength. The distances can of course be calculated as half wavelength distances (in the wave guide) of their respective desired resonant frequencies or they can be determined experimentally by adjustment of movable shorting plates or plungers along the respective arms until the resonances occur precisely at the predetermined respective frequencies. The portion 622 of the pseudohybrid junction between partitions 608 and 612 may, as mentioned above and for convenience in description, be referred to as the throat of the pseudohybrid junction and one end of the horizontal arm 606 and one end of the vertical arm 604 can then be considered as terminating at the throat 622, as shown. The free ends of arms 606 and 604 can be employed as input and output terminations, or terminals, of the over-all structure, as indicated by the arrows in Fig. 6, or their functions can be interchanged, i. e., the free end of arm 604 can be the input termination, or terminal, and the free end of arm 606 can be the output termination, or terminal.

The operation of the pseudohybrid band-pass filter of the type exemplified in Fig. 6 is apparent from the following considerations.

If the irises or coupling holes 610 and 614 were made vanishingly small the structure would become "balanced," i. e., arm 606 would be isolated from arm 604 by the inherent balance resulting from the complete symmetry of the structure and the orthogonal relationship between the respective E-planes (planes of the electric vector or shorter cross-sectional dimensions of these arms). Accordingly no transmission could take place between arms 604 and 606 and the hybrid property of balance would thus be realized by the structure. Stated in other words the dominant mode wave in either of the arms 604 or 606 could produce no net unbalanced electrical component on the dominant mode of the other.

With iris or coupling holes 610 and 614 of finite size, as in the actual structure, it is apparent, from the above discussion of Figs. 4 and 5, that as long as the combination of two irises 610 and 614 and the above-described cavities formed by closing the free ends of arms 600 and 602 are substantially identical with regard to their respective electrical impedances, the above-mentioned balance is undisturbed and no transmission can take place between arms 604 and 606.

Since at any point far from any resonance, the impedances of the two cavities (in arms 600 and 602) are substantially identical and furthermore the irises 610 and 614, far from any resonance, introduce virtually no effective coupling between their respective cavities and the throat of the junction, it is obvious that the structure approaches, at frequencies far from any resonance, very closely to the case discussed above in which it was proposed that the irises be made vanishingly small.

As the cavities have negligible ohmic losses they can be considered as being purely reactive and therefore the only question pertinent to a consideration of the mode of operation of the device is the phase of the wave reflected by each cavity.

When frequencies more closely situated with respect to the resonances are considered the effective left-hand and right-hand boundaries of the throat section 622 will no longer appear, from an electrical viewpoint based on the phase of the wave reflected from each cavity, to be in the planes of the members 612 and 608, respectively, but will appear to be further and further displaced to the left and right, respectively, as the resonances of the left and right cavities in arms 600 and 602 are approached. At the resonance of each of the cavities its associated boundary will appear to have been moved 90 electrical degrees to the left or right, respectively, for members 612 and 608.

Therefore, as the frequency is varied from a value far below the resonance frequency of either cavity to a frequency far above the resonance frequency, the effective electrical boundary of the cavity adjacent to the throat of the junction can be visualized as moving from its actual fixed position (612 or 608) along its associated arm (600 or 602) to an effective electrical distance, from the throat, of 90 electrical degrees as resonance is reached and then as moving further away from its actual position as the frequency is still further increased until it has effectively reached a distance of 180 electrical degrees when the frequency has been raised far above the resonance frequency. This latter position is, of course, indistinguishable electrically from the actual fixed position of the particular boundary (612 or 608) being considered.

As is well known to those skilled in the art, the effective breadth of the resonance of a cavity coupled to a wave-guide structure through an iris is determined by the size and shape of the iris.

Incidentally, the irised partitions 608 and 612 can advantageously be made of silver (coin silver is ordinarily satisfactory) to reduce heat losses adjacent to the irises. Alternatively they can be gold plated, the chief advantage of which is to avoid losses which may be encountered should the device be made of copper and these particular surfaces become oxidized.

The structure shown in Fig. 6 and described in detail above is then a two-resonance pseudohybrid band-pass wave-guide filter suitable for use at very high and microwave frequencies.

Suitable iris sizes can be calculated or, as mentioned above, can be arrived at empirically, by starting with a size which experience indicates will be slightly small and, then, gradually enlarging the size of the iris until the desired breadth of resonance is obtained. Should the maximum diameter of round iris in a structure of the type illustrated by Fig. 6 be found inadequate, oval or "slit' iris shapes can, obviously, be employed to obtain increased coupling or broadness of resonance. Substantial symmetry as to position and substantial equality as to size for the two orifices 610 and 614 should be maintained so that the balance of the pseudohybrid structure will not be adversely affected.

*Pseudohybrid band-rejection (reflection) filter*

Figure 7:
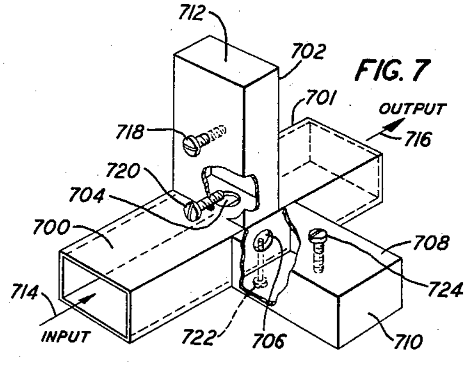
Fig. 7 is one form of band-rejection wave filter (or alternatively a wave equalizer) of the invention employing the "pseudohybrid" junction of Fig. 2.

In Fig. 7 one structure embodying the pseudohybrid junction of Fig. 2 in a wave-guide band-rejection (or band-reflection) filter suitable for use at very high microwave frequencies is shown.

In this structure the vertical arm 702 and the horizontal arm 708 are both closed at their free ends by plane conductive sheets or plates 712 and 710, respectively. In this case the two laterally extending arms 700 and 701 together with the throat of the junction, i. e., the central portion between the shorter sides of arm 708, can comprise a single substantially continuous section of wave guide either end of which can serve as the input termination, or terminal, the other end then serving as the output termination, or terminal, of the over-all band-rejection filter structure. As drawn in Fig. 7, energy 714 is introduced into the left end of member 700 and energy 716 can be taken from the right end of member 701. In actual use energy of frequencies within the band rejected by the structure will be reflected back to the left (or input) end so that the output energy 716 will comprise only frequencies outside the rejected band. Coupling orifices 704 and 706 are cut in the top and near side, respectively, of wave-guide section 700, their centers lying in a common cross-sectional plane and being centrally located with respect to the ends of arms 702 and 708, respectively, which join the wave-guide section 700, 701, as shown, their longitudinal axes being in the same common cross-sectional plane and perpendicular to the respective sides of wave-guide section 700 to which the arms are joined.

The lengths of the arms 702 and 708 are adjusted in one of the manners described in connection with the band-pass filter of Fig. 6 so that the cavities formed by closing the ends of these arms, as above described, will be resonant at different predetermined frequencies near the mid-frequency of the band of frequencies to be rejected by the over-all structure of Fig. 7.

A fine adjustment of the frequency of the cavities formed within arms 702 and 708 is afforded by screws 718 and 724, respectively, in a manner familiar to those skilled in the art. Likewise the effective coupling afforded by irises 704 and 706 between the cavities and the wave-guide section 700 can be finely adjusted by screws 720 and 722, respectively, which are located so as to project into or closely adjacent to, their respective irises.

By inspection, those skilled in the art will recognize, from the symmetry of the structure of Fig. 7 and from the fundamental principles of balanced wave-guide hybrid T junctions of this general class, that the arms 702 and 708 are isolated by the balance of the junction from each other.

The couplings afforded by the irises 704 and 706 should be relatively weak. As mentioned above, the strength of these couplings determines the broadness of resonance of the respective cavities which they couple to wave-guide section 700. The sizes of the irises can be determined as described above in connection with the band-pass pseudohybrid filter of Fig. 6.

In general, if the couplings afforded by the irises are small and the frequency is far from the resonant frequency of both cavities the transmission of energy through wave-guide section 700, 701 is substantially undisturbed. As the resonance frequencies are approached a movement of the effective electrical boundary away from the actual boundary which includes iris 704 or 706 can be visualized for the cavities of arm 702 or 708, respectively, exactly as described in detail in connection with Fig. 6. In the case of Fig. 7 however, the energies reflected from the cavities of arms 702 and 708 are out of phase and therefore combine to cause reflection back to the input end (left end) of member 700 over the band of frequencies to be rejected by the over-all structure of Fig. 7.

*Pseudohybrid equalizer*

If in the structure of Fig. 7 both of the cavities in arms 702 and 708 are adjusted to precisely the same resonant frequency an all-pass wave filter is obtained. All-pass wave filters, as is well known to those skilled in the art, are employed as phase equalizers. (See reference to "Radio Engineer's Handbook" above.)

They can be readily converted into attenuation equalizers by inserting a predetermined amount of ohmic loss in one or both of the cavities of arms 702 and 708. Loss can be introduced, for example, by inserting energy-absorbing devices such as dielectric cards coated with carbon particles or the like in the cavities, as is well known to those skilled in the art.

*Pseudohybrid band-pass, band-rejection or all-pass (equalizer) wave filters of more complex types*

The individual structures described in detail under the immediately preceding three headings were the simplest or "prototype" pseudohybrid structures.

Numerous and varied modifications and rearrangements of these "prototypes" can be made and a few of the possibilities in this direction will be described in detail below.

*Four-resonance pseudohybrid band-pass filter*

Figure 8:
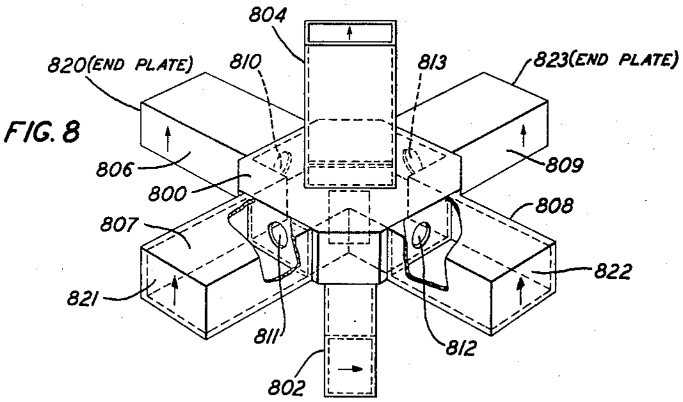
Fig. 8 is one form of a four-resonance band-pass wave filter of the invention employing a more complex pseudohybrid junction, equivalent for the purposes of the particular structure involved to the "pseudohybrid" junction of Fig. 4.

In Fig. 8 a pseudohybrid band-pass wave-guide filter structure is shown which is related to the "prototype" form of Fig. 6.

In Fig. 8, however, the two wave-guide arms 802 and 804, either of which can be the input termination, or terminal, and the other the output termination, or terminal, of the over-all structure, are joined to the top and bottom surfaces of a throat section 800. Throat section 800 is essentially a four-armed internally cross-shaped member formed by extending arms 806 to 809, inclusive, inwardly until their sides meet. Arms 802 and 804 have a common longitudinal axis which is also coincident with the vertical axis of throat section 800. Arms 802 and 804 are further arranged so that their longer cross-sectional dimensions are at right angles to each other. The said longer cross-sectional dimension of one of said arms is parallel to one diagonal axis of throat section 800 and the said longer cross-sectional dimension of the other of said arms is parallel to the other diagonal axis of throat section 800.

The four lateral wave-guide arms 806 to 809, inclusive, are coupled, as shown, to the center points of the four major sides of throat section 800 by orifices 810 to 813, inclusive, respectively. Irises 810 to 813 should be equidistant from the common longitudinal axis of arms 802 and 804. While the septa in which these irises are located could be positioned at the inner ends of their respective arms 806 to 809 the construction of the device of Fig. 8 in the manner shown provides more room in the central portion of the device and therefore facilitates manufacture thereof. The free ends of arms 806 to 809, inclusive, are closed by conductive plane sheets or plates 820 to 823, inclusive, respectively. The common longitudinal axis of arms 806 and 808 is obviously coincident with one lateral axis of throat section 800 and the common longitudinal axis of arms 807 and 809 is also, obviously, coincident with the other lateral axis of throat section 800. The larger cross-sectional dimensions of all of the arms 806 to 809, inclusive, are in common horizontal planes parallel to the planes in which the top and bottom surfaces of throat section 800 lie. From the complete symmetry of the throat section 800 and the orthogonal relation between the major cross-sectional dimensions of arms 802 and 804 it is apparent that were orifices 810 to 813 made vanishingly small no transmission would take place between arms 802 and 804.

The analysis applied to the structure of Fig. 6 is therefore applicable also to that of Fig. 8, the sole significant factor being that as the structure of Fig. 8 has four lateral arms containing cavities formed by the insertion of the irised partitions adjacent the throat section 800 and the end sheets or plates at the far ends of these arms, a four-resonance band-pass wave filter is provided by the structure of Fig. 8 whereas the structure of Fig. 6 provides two resonances. As is well known to those skilled in the art a more uniform attenuation or delay characteristic throughout the pass band or greater discrimination in the attenuating frequency regions can be provided by a filter having a larger number of resonances.

*Three and four-resonance band-rejection pseudohybrid filters*

Figure 9:
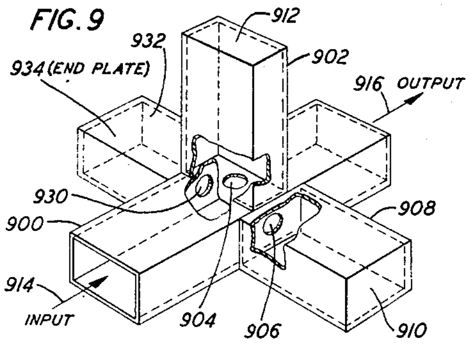
Fig. 9 is one form of a three-resonance band-rejection wave filter of the invention employing a modification of the "pseudohybrid" junction of Fig. 2.
Figure 10:
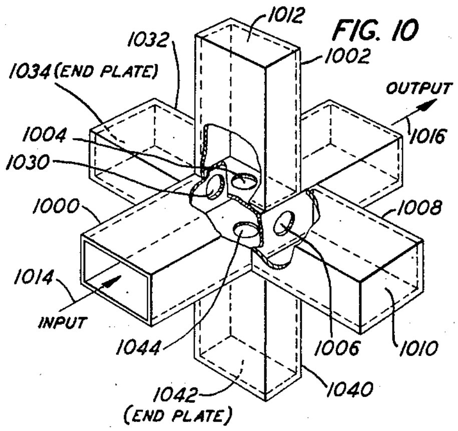
Fig. 10 is one form of a four-resonance band-rejection wave filter of the invention employing a further modification of the "pseudohybrid" junction of Fig. 2.

In Figs. 9 and 10, three-resonance and four-resonance band-rejection (or band-reflection) pseudohybrid filters are shown, respectively.

In Fig. 9 the straight section of wave guide 900 provides input and output arms and a centrally located throat portion for the structure and the lateral arms 908, 902 and 932 are coupled by irises 906, 904 and 930, respectively, to the throat portion of the wave-guide section 900, the centers of all three said irises being in a common cross-sectional plane. The free ends of arms 908, 902 and 932 are closed by plane conductive sheets or plates 910, 912 and 934, respectively. It is apparent by inspection that the structure of Fig. 9 is identical with that of Fig. 7 except that the additional arm 932 is added. Electrically this of course provides an additional resonance so that the device of Fig. 9 is a three-resonance instead of a two-resonance band-rejection filter.

In Fig. 10, similarly, a fourth arm 1040 has in effect been added to the structure of Fig. 9. Arm 1040 is coupled to wave-guide section 1000 by iris 1044 which is of course centered in the common cross-sectional plane with the other three irises. Elements of Fig. 10 corresponding to elements of Fig. 9 have been given the same unit and decimal designation numbers as the corresponding elements of Fig. 9 and the description of these elements in connection with Fig. 9 is directly applicable to the corresponding ten-hundred series designation numbered elements of Fig. 10.

The structure of Fig. 10 is obviously a four-resonance band-rejection pseudohybrid filter of the same general type as the two-resonance filter of Fig. 7.

*Pseudohybrid microwave band-pass and band-rejection filters with "n" resonances*

Figure 11:
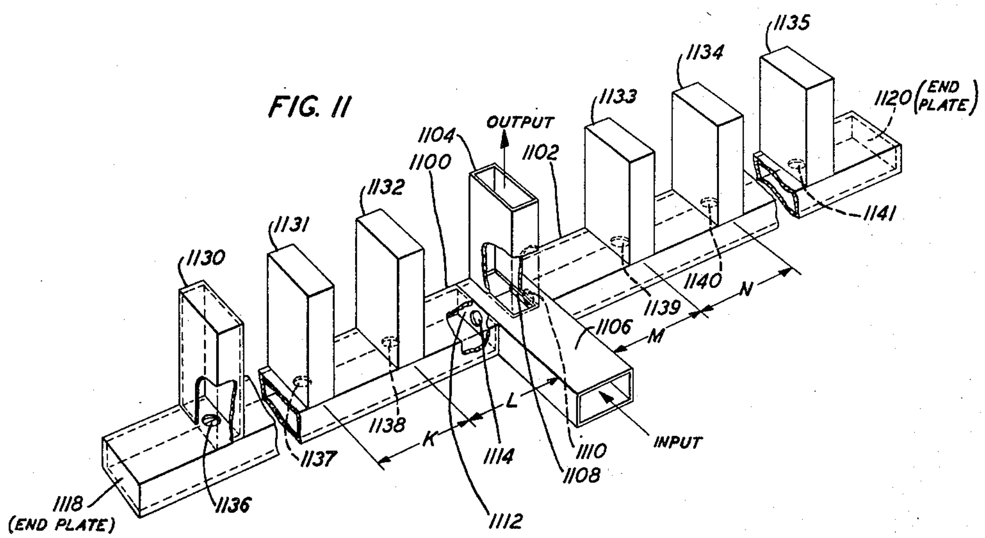
Fig. 11 is a further form of multiple resonance band-pass wave filter of the invention employing the "pseudohybrid" junction of Fig. 4.

In Fig. 11 one structurally convenient form of pseudohybrid microwave band-pass filter having any desired number of resonances is illustrated. The input and output arms 1106 and 1104, the septa or partitions 1108 and 1112, the irises 1110 and 1114 and the throat section between the partitions 1108 and 1112 can be identical with the corresponding parts of the band-pass filter shown in Fig. 6 and described in detail above.

The structure of Fig. 11, obviously, differs from that of Fig. 6 in that the singly resonant sections of wave guide 600 and 602 of Fig. 6 are replaced by longer sections of wave guide 1100 and 1102. Along sections 1100 and 1102, at intervals between centers K, L, M, N, etc. of one-half wavelength (in the guide) of the median frequency of the band of frequencies with which the device is to be used, are placed a plurality of singly resonant sections of wave guide 1130 to 1136, inclusive, at right angles to said sections 1100 and 1102, as shown, the sections 1130 to 1136, inclusive, being coupled to the longer adjacent section 1100 or 1102, by orifices or irises 1136 to 1141, inclusive, respectively. Breaks are shown in the longer sections 1100 and 1102 to indicate that they can be indefinitely extended. It is to be understood likewise that additional shorter sections of the type 1130 to 1135, can be added as the lengths of sections 1100 and 1102 are extended so that, as taught in my above-mentioned copending application Serial No. 789,985, filed December 5, 1947, and entitled "Hybrid Channel-Branching Microwave Filters" (see Figs. 13 and 14 and the related detailed description of those figures in that application), any desired number of resonances can be effectively introduced at either or both of the irises 1110 and 1114. In other words, intervals K, L, M and N and all other intervals between the coupling points of the smaller sections of wave guide such as 1130 to 1135, inclusive, to sections 1100 or 1102 should be one-half wavelength (within the guide) of the above-mentioned median frequency. The same one-half wavelength interval should exist between the closed ends 1118 and 1120 of sections 1100 and 1102, respectively, and the coupling points of the end cavities 1130 and 1135, respectively. Any integral number of half wavelengths can of course be used instead of just one-half wavelength should mechanical convenience render it desirable.

Alternatively, the number of resonant frequencies can be increased by coupling additional shorter resonant sections of wave guide to the longer sections of wave guide 1100 and 1102 at points directly opposite those at which the shorter sections 1130 to 1135, inclusive, are coupled. This specific arrangement of shorter wave guide sections is, of course, illustrated in Fig. 12 in conjunction with the form of pseudohybrid junction adapted for use in band-rejection filters.

Figure 12:
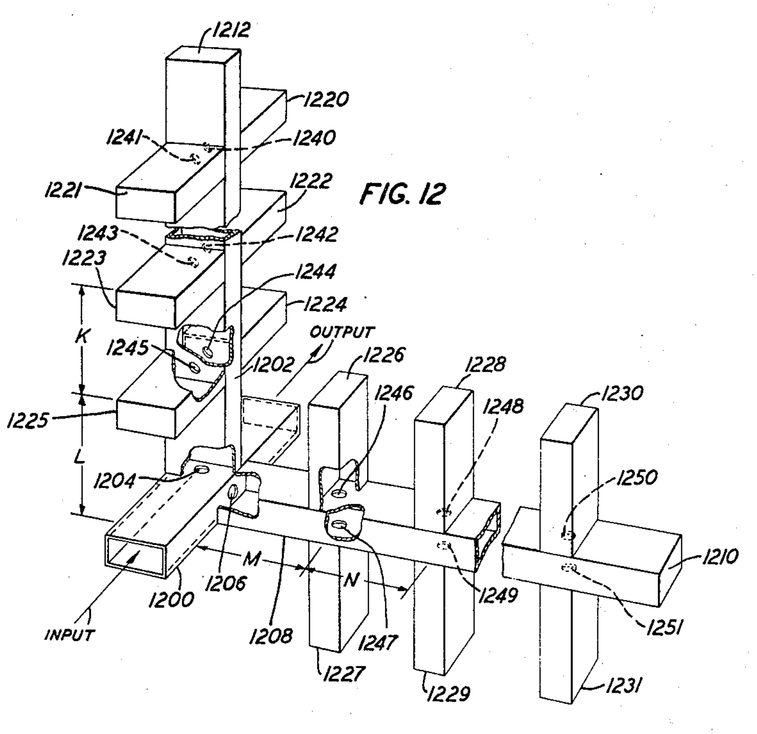
Fig. 12 is a further form of multiple resonance band-rejection wave filter of the invention employing the "pseudohybrid" junction of Fig. 2.

In Fig. 12 a structurally convenient form of pseudohybrid microwave band-rejection filter or equalizer having any desired number of resonances is illustrated. The input and output arms comprising a straight section of wave guide 1200 including the throat section with the irises 1204 and 1206 can be identical with the corresponding portions of the structure shown in Fig. 7. (Tuning screws 718, 720, 722 and 724, as explained in connection with Fig. 7, represent conventional well-known means for making fine adjustments of coupling or resonance and can be added to any type of microwave filter or equalizer structure wherever and whenever such finer adjustments are desired. To avoid unnecessary complexity they are being shown in Fig. 7 only.)

The horizontal and vertical arms 1208 and 1202, respectively, are of the type of wave-guide structure described in my copending application Serial No. 789,985 mentioned above and are similar to the arms 1100 and 1102 of Fig. 11 except that the resonator sections 1220 and 1231, inclusive, are assembled on both sides of the longer wave-guide sections 1202 and 1208, as shown. The resonator sections 1220 to 1231, inclusive, are coupled to their respective longer sections of wave guide by orifices 1240 to 1251, inclusive, respectively, as taught in my above-mentioned copending application. The longer wave-guide sections 1202 and 1208 are shown with breaks therein to indicate that they can be indefinitely extended and additional shorter resonator sections can be added at half-wavelength intervals to effectively provide any desired number of resonant frequencies at either or both of the irises 1204 and 1206. In other words intervals K, L, M and N should be one-half wavelength or an even number of half wavelengths and other resonator sections added to arms 1202 and 1208 should be similarly spaced with respect to adjacent sections or to the ends 1210 and 1212 of the longer arms for sections nearest those ends, respectively.

Figure 13:
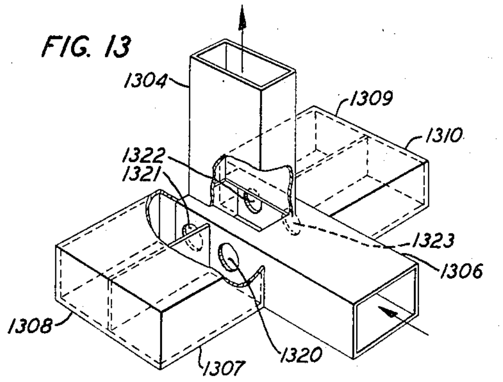
Figs. 13 to 15 illustrate additional ways in which multiple resonance structures of the invention can be assembled.
Figure 14:
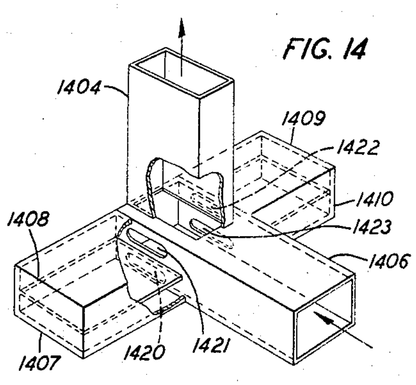

Figs. 13 and 14 show alternative forms of band-pass filters of the general type illustrated in Fig. 6, in which the number of resonances is doubled in Fig. 3 by coupling four resonators 1307 to 1310, inclusive, directly to the throat section of the pseudohybrid structure, having horizontal input arm 1306 and vertical output arm 1304, the resonators being coupled to the throat section by means of orifices 1320 to 1323, inclusive, respectively.

In Fig. 14 the four resonant cavities 1407 to 1410, inclusive, are coupled to the throat section of the pseudohybrid structure, having horizontal input arm 1406 and vertical output arm 1404, the resonators being coupled to the throat section by means of orifices 1420 to 1423, inclusive, respectively.

Figure 15:
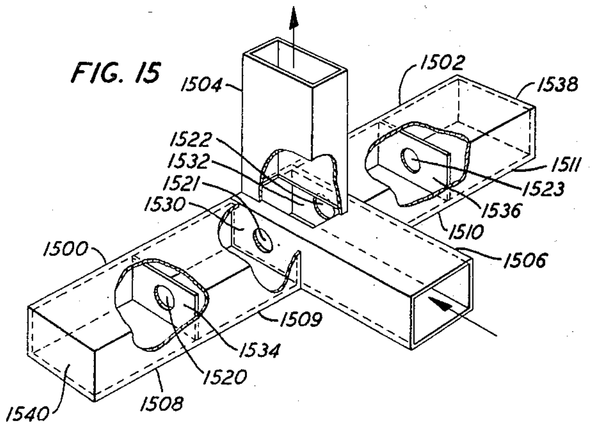

In Fig. 15 a still further way of increasing the effective number of resonances at the orifices 1521 and 1522 in the partitions 1530 and 1532, respectively, forming the left and right sides, respectively, of the throat section of the pseudohybrid junction of which horizontal arm 1506 and vertical arm 1504 are the input and output terminals respectively.

The distinctive feature of the structure of Fig. 15 is of course that the additional cavities 1508 and 1511 are coupled to the left end of cavity 1509 and the right end of cavity 1510, respectively, by means of orifices 1520 and 1523 respectively in the partitions 1530 and 1536, respectively, which form the outermost ends of cavities 1509 and 1510, respectively. The lengths of all four cavities 1508 to 1511, inclusive, are approximately one-half wavelength of the median frequency of the frequency range of interest but each is slightly different in length from the other three so that each is resonant at a different frequency within the frequency region of interest. Arms 1500 and 1502 can be indefinitely extended in length to permit the inclusion of as many additional cavities such as 1508 to 1511, inclusive, as may be required to furnish a desired number of resonances, each additional cavity being coupled to the one next nearest the throat section of the pseudohybrid through an iris as shown for the four cavities of Fig. 15. The left end of arm 1500 and the right end of arm 1502 are closed by sheet metal plates 1540 and 1538, respectively, as shown.

Figure 16:
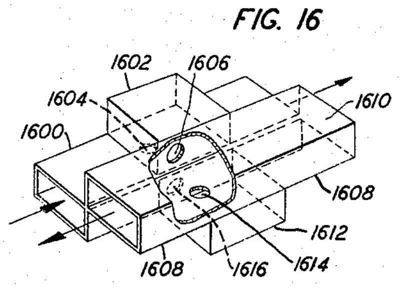
Fig. 16 shows a further complex structure of the invention illustrating the use of pseudohybrid junctions in forming a constant resistance type hybrid branching circuit arrangement.

In Fig. 16 a more complex type of "microwave" or very high frequency structure is illustrated which employs two pseudohybrid junctions and as will become apparent hereinunder comprises a new form of constant resistance channel branching filter related to the structures disclosed in my copending application Serial No. 789,985 mentioned above and in the copending application Serial No. 789,812 filed December 5, 1947 by A. G. Fox, assignor to applicant's assignee, which latter application matured into United States Patent 2,531,419, granted November 28, 1950.

In Fig. 16 the portion of wave guide 1600 is, for example, a transmission line carrying a plurality of communication channels comprising discrete frequency bands in the microwave frequency region. The portion of wave guide 1608 is a second transmission line into which it is desired to branch off one only, of the plurality of frequency bands being transmitted along the wave guide 1600.

The two orifices 1604 and 1616 in the top and near side, respectively, of wave guide 1600 couple the guide to resonant cavities 1602 and 1612 respectively and the combination of a straight section of wave guide with two resonant cavities coupled through their respective orifices in a common vertical plane is readily recognizable as a form of band rejection filter of the general type described in detail above and illustrated, for example, in Fig. 7.

Likewise, the section of wave guide 1608 coupled, in a common vertical plane, by orifices 1614 and 1606 in its lower surface and far side, respectively, to resonators, or resonant cavities, 1612 and 1602, respectively, also constitutes a band-rejection filter of the general type described in connection with Fig. 7, above.

As described above, all of the frequency bands remote from the resonant frequency of resonators 1602 and 1614 pass freely along wave guide 1600 from its input (left) end to its output (right) end.

At and near the resonant frequency of cavities or resonators 1602 and 1614, however, the energy introduced into the left end of wave guide 1600 enters the resonators and passes by way of orifices 1614 and 1616 into the wave guide 1608, the phase relations being such that it combines to pass out of the near or left end of wave guide 1608. To avoid the possibility of establishing a balance in either of the cavities 1602 or 1612 the orifices 1604 and 1606 for cavity 1602 and 1614 and 1616 for cavity 1612 should be displaced from the lateral axes (i. e., the axes of the cavities which lie in a plane parallel to the plane of the axes of wave guides 1600 and 1608 but which cavity axes are turned 90 degrees in their plane with respect to the direction of the wave guide longitudinal axes). For maximum transfer of energy through a cavity from one wave guide to the other the orifices should be one-quarter wavelength nearer one side of the cavity than the other as shown in Fig. 16. Any substantial displacement would, however, serve to effect the desired transfer of a substantial part of the energy.

The far (right) end of wave guide 1608 can be closed by a copper or brass sheet or plate 1610. Alternatively, a matching impedance can be connected to the far (right) end of wave guide 1608 to absorb any energy of frequencies outside of the frequency band to be branched off the main guide 1600 which may happen to leak through the pseudohybrid junctions described above and the resonators 1602 and 1612.

Figure 18:
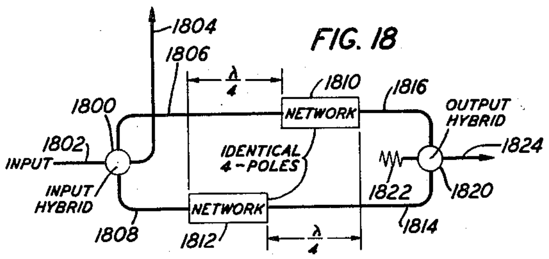
Fig. 18 shows in schematic block diagram form the equivalent electrical circuit of the structures of Figs. 16 and 17.

With respect to each pseudohybrid junction there is an inherent difference of 90 electrical degrees between the energy derived from an iris in the wider side (such as irises 1604 and 1614) and that derived from an iris in the more narrow side (such as irises 1606 and 1616) so that the structure of Fig. 16 can be accurately represented in the electrical schematic diagram form, by the diagram of Fig. 18. This will become apparent during the detailed description of Fig. 18 given hereinunder.

Figure 17:
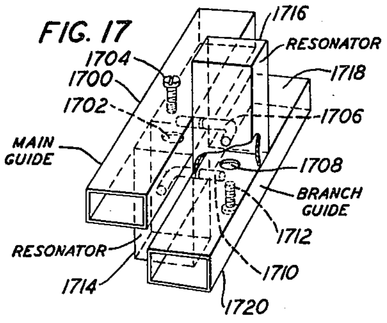
Fig. 17 illustrates an alternative form of complex structure of the invention also showing the use of pseudohybrid junctions in forming a constant resistance type hybrid branching circuit arrangement.

In Fig. 17 an alternative arrangement of structure very similar to that of Fig. 16 is shown. In Fig. 17, however, one coupling of the main guide 1700 to one cavity resonator 1716 is effected by means of a probe 1706 instead of an iris and the degree of coupling to the main wave guide 1700 can be adjusted by turning screw 1704 which is threaded through the upper surface of guide 1700 adjacent to the end of probe 1706 as shown. From elementary wave-guide principles it is apparent that with the lower end of screw 1704 just flush with the inner surface of the upper side of wave guide 1700 the portion of probe 1706 extending into wave guide 1700 would have no coupling with the waves passing through the wave guide since that portion of the probe is perpendicular to the electric vector of the waves. The insertion of screw 1704 downwardly and beyond the inner surface of the upper side of wave guide 1700, however, distorts the wave form to a degree determined by the amount which screw 1704 protrudes into wave guide 1700 and thus establishes a coupling of the probe 1706 to the waves passing along wave guide 1700 which coupling is, obviously, in turn also dependent upon the protrusion of screw 1704 into wave guide 1700.

Wave guide 1700 is coupled to resonator 1714 by a simple iris 1702 in the lower side of the wave guide, as shown.

Similarly, the branch wave guide 1720 is coupled to resonator 1716 by simple iris 1708, as shown, and to resonator 1714 by probe 1710, the coupling of probe 1710 to wave guide 1720 being adjustable by turning screw 1712 which is threaded through its lower surface, as shown, the arrangement being precisely that described immediately above for wave guide 1700, probe 1706 and screw 1704. Aside from the adjustable coupling features just described the arrangement of Fig. 17 is substantially identical with that of Fig. 16. The branched channel is transmitted through resonators 1714 and 1716 to branch guide 1720 and the phase relations are such that the energy of this channel is directed out the near or left end of branch guide 1720. The other channels pass freely through guide 1700 without let or hindrance. The far (right) end of branch guide 1720 can be closed by a copper or brass sheet or plate 1718 or it can be terminated in a matching impedance as for the branch guide 1608 of Fig. 16.

In Fig. 18, as was mentioned previously, an equivalent electrical schematic diagram of the structures of Figs. 16 and 17 is shown. In Fig. 18 the input hybrid 1800 having terminal 1802 and output terminal 1804 can represent the main wave guide 1600 of Fig. 16 or 1700 of Fig. 17. The other two arms 1806 and 1808 of the hybrid represent the couplings effected by the irises 1604 and 1616 of Fig. 16 or of probe 1706 and iris 1702 of Fig. 17. As previously explained, there is an inherent 90 electrical degrees phase difference between these two couplings in each instance which is represented in Fig. 18 by the additional length of one-quarter wavelength shown for arm 1806 as compared with arm 1808. Networks 1810 and 1812 represent the resonant cavities 1602 and 1612 of Fig. 16 or 1716 and 1714 of Fig. 17, respectively. In a similar way the output hybrid 1820 having arms 1824 and 1822 which later may include a matching impedance termination or a simple short circuit can comprise branch guide 1608 of Fig. 16 or branch guide 1720 of Fig. 17. Arms 1814 and 1816 can represent the couplings of orifices 1606 and 1614 of Fig. 16 or of probe 1710 and orifice 1708 of Fig. 17.

Figure 19:
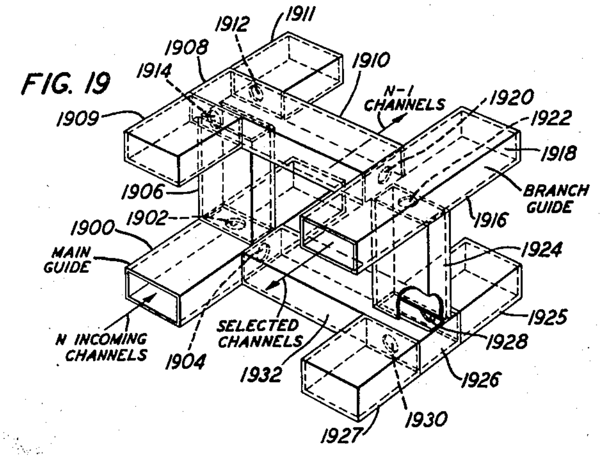
Fig. 19 shows a still further structure of the invention embodying four pseudohybrid junctions, the structure being a further form of the constant resistance type hybrid branching circuit arrangement.

In Fig. 19 a more complex form of the general type of constant resistance branching filter illustrated in the above-described Figs. 16 and 17 is shown.

In Fig. 19 the two paths connecting the main guide 1900 and the branch guide 1916 each comprise a complete pseudohybrid band-pass filter of the type illustrated in Fig. 6 and described in detail above.

One of these paths consists of vertical arm 1906, horizontal arm 1910 and a section of wave guide comprising a throat section 1908 coupled by orifices 1912 and 1914 to closed resonant cavities 1911 and 1909, respectively, all of which are proportioned and arranged as described in connection with Fig. 6 to form a pseudohybrid band-pass filter of the invention passing the single band or channel of frequencies which is to be branched off to the branch wave guide 1916. Vertical arm 1906 connects to the main guide 1900 through orifice 1902 in the upper (broad) surface of guide 1900 as shown. Horizontal arm 1910 connects to the branch guide 1916 through orifice 1920 in the far or left (narrow) side of guide 1916.

The other path connecting the main and branch guides consists of horizontal arm 1932, vertical arm 1924 and a section of wave guide comprising a throat section 1926 coupled by orifices 1928 and 1930 to closed resonant cavities 1925 and 1927, respectively, all of which are also proportioned and arranged as described in connection with Fig. 6 to form a pseudohybrid band-pass filter of the invention passing the single band or channel of frequencies which is to be branched off to the branch wave guide 1916. Horizontal arm 1932 is coupled to main guide 1900 through orifice 1904 in the near (narrow) side of the main guide 1900. Vertical arm 1924 is coupled to the branch guide 1916 through orifice 1922 in the lower (broad) surface of branch guide 1916.

The main guide 1900 provided with orifices 1902 and 1904 in a broad (upper) and narrow (side) surface thereof, the orifices being centered in a common vertical cross-sectional plane of the guide, constitutes a pseudohybrid junction of the invention. Assuming the left (near) end of guide 1900 to be the input terminal and the right (far) end of guide 1900 to be the output terminal, energy of all of the frequency bands or channels of the system will be introduced into the near end of guide 1900. One of these channels depending upon which is passed by the above-described pseudohybrid junctions and pseudohybrid band-pass filters of Fig. 19 will be transmitted to the branch guide 1916. The remaining channels will all be freely transmitted to the output terminal of guide 1900.

Branch guide 1916 with orifices 1920 and 1922 in its far (narrow) side and in its lower (broad) side, respectively, the orifices being centered in a common vertical cross-sectional plane of the guide, likewise constitutes a pseudohybrid junction of the invention. The phase relation of the energies arriving in wave guide 1916 via the two paths described in detail above, is such that they will combine to pass freely out of the left (near) end of branch guide 1916. The right (far) end of guide 1916 can be closed by a sheet of copper or brass 1918 or it can be terminated by an impedance termination equal to the characteristic impedance of the guide 1916 as discussed above in connection with Figs. 16 and 17.

The above-described illustrative structures by no means exhaust the possibilities inherent in the principles of the invention. Numerous and varied additional structures embodying the spirit and within the scope of the invention will occur to those skilled in the art.

What is claimed is:

1. A high frequency, electromagnetic wave, wave-guide hybrid junction comprising a first straight section of high frequency, electromagnetic wave, wave guide having a rectangular cross-section with one dimension of said cross-section substantially larger than the other, a second straight section of high frequency, electromagnetic wave, wave guide having the same cross-sectional dimensions as said first section and joining to a smaller side of said first section perpendicularly, with the larger cross-sectional dimension of said second section parallel with the longitudinal axis of said first section, a third straight section of high frequency, electromagnetic wave, wave guide having the same cross-sectional dimensions as said first section and joining to a larger side of said first section perpendicularly, with the larger cross-sectional dimension of said third section perpendicular to the longitudinal axis of said first section, the longitudinal axes of said second and third sections being in a common plane, said plane being perpendicular to the longitudinal axis of said first section, said second and third sections comprising a first conjugately related pair of terminals of said wave-guide junction, the end portions of said first section comprising a second conjugately related pair of terminals of said wave-guide junction, the portion of said first section of wave guide intermediate the lines at which the smaller sides of said second section join with said first section constituting the throat section of said junction, a highly conductive partition in each terminal wave guide of one of said pairs only, across the plane in which each of said pair of terminal wave guides of said one of said pairs joins said throat section of said junction and means, associated with each of said highly conductive partitions for electrically coupling each terminal of said one of said pairs loosely to said throat section, said coupling means having a coefficient of coupling less than one-tenth.

2. A high frequency, electromagnetic wave, pseudohybrid junction comprising a first pair of high frequency, electromagnetic wave, transmission line terminals, a second pair of high frequency, electromagnetic wave, transmission line terminals, a throat section or junction section in which all energy from either terminal of one of said pairs will divide equally between the terminals of the other of said pairs and a pair of septa, one across each terminal of one of said pairs only, in the plane of intersection of said terminal with said throat or junction section, said septa including means for loosely coupling their rerespective associated terminals with said throat or junction section, said coupling means having a coefficient of coupling less than one-tenth.

3. A microwave electromagnetic wave waveguide wave filter comprising a first straight section of high frequency, electromagnetic wave, wave guide of rectangular cross-section, second and third straight sections of high frequency, electromagnetic wave, wave guide of like cross-sectional dimensions with said first section, said second and third sections joining said first section in a common plane perpendicular to the longitudinal axis of said first section, the longitudinal axes of said second and third sections being perpendicular to each other, the second and third sections being joined to said first section with one like cross-sectional dimension of each of the joining guides being coincident, respectively, to form a high frequency, electromagnetic wave, magic T type wave-guide junction having a throat section, two conjugately related arms of said junction only, being separated by septa from said throat section, each septum being located at the plane of juncture of its associated arm with said throat section, and having an iris loosely coupling its associated arm, electrically, to said throat section, each said iris having a coefficient of coupling less than one-tenth, said two conjugately related arms being closed at a distance of approximately one-half wavelength from said throat section of said junction.

4. A microwave, electromagnetic wave, waveguide structure comprising first, second and third straight sections of high frequency, electromagnetic wave wave guide, said second and third straight sections of wave guide being perpendicular to each other and to said first straight section, said second and third straight sections of wave guide having their longitudinal axes located in a common plane and being coupled to said first section at their respective planes of juncture with said first section by irises providing relatively weak electrical couplings to said first section, the center points of said irises lying in said common plane each said iris having a coefficient of coupling less than one-tenth.

5. The structure of claim 4, said second and said third wave-guide sections being closed at a distance of approximately one-half wavelength from their respective coupling irises.

6. A microwave, electromagnetic wave, wave-guide structure comprising first, second and third straight sections of high frequency, electromagnetic wave, wave guide, said second and third sections of wave guide being perpendicular to each other and perpendicular to said first section, said second and said third sections having their longitudinal axes in a common plane, said second and said third sections joining said first section throughout their respective full cross-sectional areas, said first straight section having two septa perpendicularly placed with respect to the longitudinal axis of said first section and at a distance of one-half the maximum cross-sectional dimension of said second and third sections from the common plane of the longitudinal axes of said second and third sections, said septa including means for loosely coupling their respective ends of said first straight section of wave guide electrically to the portion of said first section intermediate said septa.

7. The structure of claim 6, each of the outer ends of said first straight section of wave guide being closed at a distance of approximately one-half wavelength from the nearer of said two septa respectively.

8. A microwave, electromagnetic wave, wave-guide structure comprising a first straight section of high frequency, electromagnetic wave, wave guide and a plurality of straight sections of high frequency, electromagnetic wave, wave guide, said plurality of sections having their longitudinal axes in a common plane, said plane being perpendicular to the longitudinal axis of said first section, the longitudinal axes of said plurality of straight sections being displaced in their common plane by an integral multiple of 90 degrees with respect to each other, each of said plurality of straight sections joining said first section and including in the plane of its juncture with said first section means for loosely coupling electrically to said first straight section substantially in the common plane of said plurality of straight sections each said coupling means having a coefficient of coupling less than one-tenth.

9. The structure of claim 8 each of said plurality of straight sections being closed at a distance of approximately one-half wavelength from their respective coupling points with said first straight section of wave guide.

10. A microwave, electromagnetic wave, wave-guide structure comprising an input section of high frequency, electromagnetic wave, wave guide, an output section of high frequency, electromagnetic wave, wave guide, the longitudinal axes of said input and output sections lying in a first common plane, a throat section of wave guide mechanically and electrically coupling said input and said output sections of wave guide, a plurality of high frequency, electromagnetic wave, wave guide resonant structures, each of said resonant structures joining said throat section and each of said structures including at its plane of juncture with said throat section means for loosely coupling electrically to said throat section, each said coupling means having a coefficient of coupling less than one-tenth the coupling points of said plurality of resonant structures lying substantially in a second common plane at right angles to said first common plane, said input and said output wave guides being conjugately related to each other over a portion at least of the frequency region with which the over-all structure is to be used.

11. In a microwave, electromagnetic wave, wave-guide structure, a throat section or junction section of electromagnetic wave wave guide, an input section of electromagnetic wave wave guide, and an output section of electromagnetic wave wave guide connected by and through said throat section and a plurality of electromagnetic wave resonant chambers connecting electrically through relatively weak electrical coupling means to said throat section, said coupling means being situated at the points of juncture of their respective resonant chambers with said throat section, the over-all structure being proportioned and arranged to render said input and said output wave guides conjugate over a predetermined microwave frequency band each of said coupling means having a coefficient of coupling of less than one-tenth.

12. A microwave, electromagnetic wave, wave-guide structure comprising a throat section of, electromagnetic wave, wave guide, a first pair of, electromagnetic wave, wage-guide sections connecting in opposed relation to said throat section and a second pair of, electromagnetic wave, wave-guide sections, one of said second pair of sections connecting to said throat section in series relation to said first pair of wave-guide sections, the other of said second pair of sections connecting to said throat section in parallel relation to said first pair of wave-guide sections, one pair only, of said pairs of wave-guide sections including at their respective points of juncture with said throat section, means for loosely coupling electrically to said throat section each of said coupling means having a coefficient of coupling of less than one-tenth.

13. The arrangement defined in claim 12 in which said first pair of wave-guide sections is loosely coupled electrically to said throat section.

14. The arrangement defined in claim 12 in which said second pair of wave-guide sections is loosely coupled electrically to said throat section.

15. A high frequency, electromagnetic wave, wave guide, transducer comprising a throat section of rectangular, high frequency, electromagnetic wave, wave guide, said wave guide having one cross-sectional dimension larger than the other, the length of said throat section being equal to its larger cross-sectional dimension, a first group of high frequency, electromagnetic wave, wave guide, structures comprising a pair of high frequency, electromagnetic wave, wave guide, structures, one structure of said pair connecting electrically to each end of said throat section of wave guide, a second group of high frequency, electromagnetic wave, wave guide, structures, comprising a plurality of high frequency, electromagnetic wave, wave guide, structures, each structure of a portion of said second group of structures connecting electrically to a broader side of said throat section, each structure of the remainder of said second group of structures connecting electrically to a narrower side of said throat section, each structure of one only, of said groups of wave guide, structures including means for loosely coupling electrically to said throat section at its juncture with said throat section, each of said coupling means having a coefficient of coupling of less than one-tenth, each of said loosely coupled structures being proportioned to be resonant at at least one frequency within the band of frequencies with which said transducer is designed to be used.

16. The transducer of claim 15 in which the said first group of high frequency, electromagnetic wave, wave guide, structures are loosely coupled electrically to said throat section of high frequency, electromagnetic wave, wave guide, said structures of said first group each being a straight section of wave guide short-circuited at a distance of substantially one-half wavelength of the median frequency of the band of frequencies to be used, from its point of juncture with said throat section.

17. The transducer of claim 15 in which the said first group of high frequency, electromagnetic wave, wave guide, structures are loosely coupled electrically to said throat section of high frequency, electromagnetic wave, wave guide, said structures of said first group each being a high frequency, electromagnetic wave, wave guide, structure having a plurality of resonant frequencies within the band of frequencies with which the said transducer is designed to be used.

18. The transducer of claim 15 in which the said second group of high frequency, electromagnetic wave, wave guide, structures are loosely coupled electrically to said throat section of high frequency, electromagnetic wave, wave guide, said structures of said second group each being a straight section of wave guide short-circuited at a distance of substantially one-half wavelength of the median frequency of the band of frequencies to be used, from its point of juncture with said throat section.

19. The transducer of claim 15 in which the said second group of high frequency, electromagnetic wave, wave guide, structures are loosely coupled electrically to said throat section of high frequency, electromagnetic wave, wave guide, said structures of said second group each being a high frequency, electromagnetic wave, wave guide, structure having a plurality of resonant frequencies within the band of frequencies with which the said transducer is designed to be used.

20. The transducer of claim 15 in which the said second group of high frequency, electromagnetic wave, wave guide, structures are loosely coupled electrically to said throat section of high frequency, electromagnetic wave, wave guide, said structures of said second group each being a straight section of wave guide short-circuited at a distance of substantially one-half wavelength of the median frequency of the band of frequencies to be used, from its point of juncture with said throat section, said second group of structures comprising a pair of structures, one being connected electrically to a broader side of said throat section, the other being connected electrically to a narrower side of said throat section.

21. The transducer of claim 15 in which the said second group of high frequency, electromagnetic wave, wave guide, structures are loosely coupled electrically to said throat section of high frequency, electromagnetic wave, wave guide, said structures of said second group each being a straight section of wave guide short-circuited at a distance of substantially one-half wavelength of the median frequency of the band of frequencies to be used, from its point of juncture with said throat section, said second group of structures comprising two pairs of structures, one pair being connected electrically to the pair of broader sides of said throat section, respectively, the other pair being connected electrically to the pair of narrower sides of said throat section, respectively.

WILLARD D. LEWIS.

References Cited in the file of this patent

"Magic-Tee Waveguide Junction" by Saxon and Miller, pub. in Wireless Engineer, May 1948 (pages 138–147 incl.). Copy in 250–33.63.